UNITED STATES PATENT OFFICE.

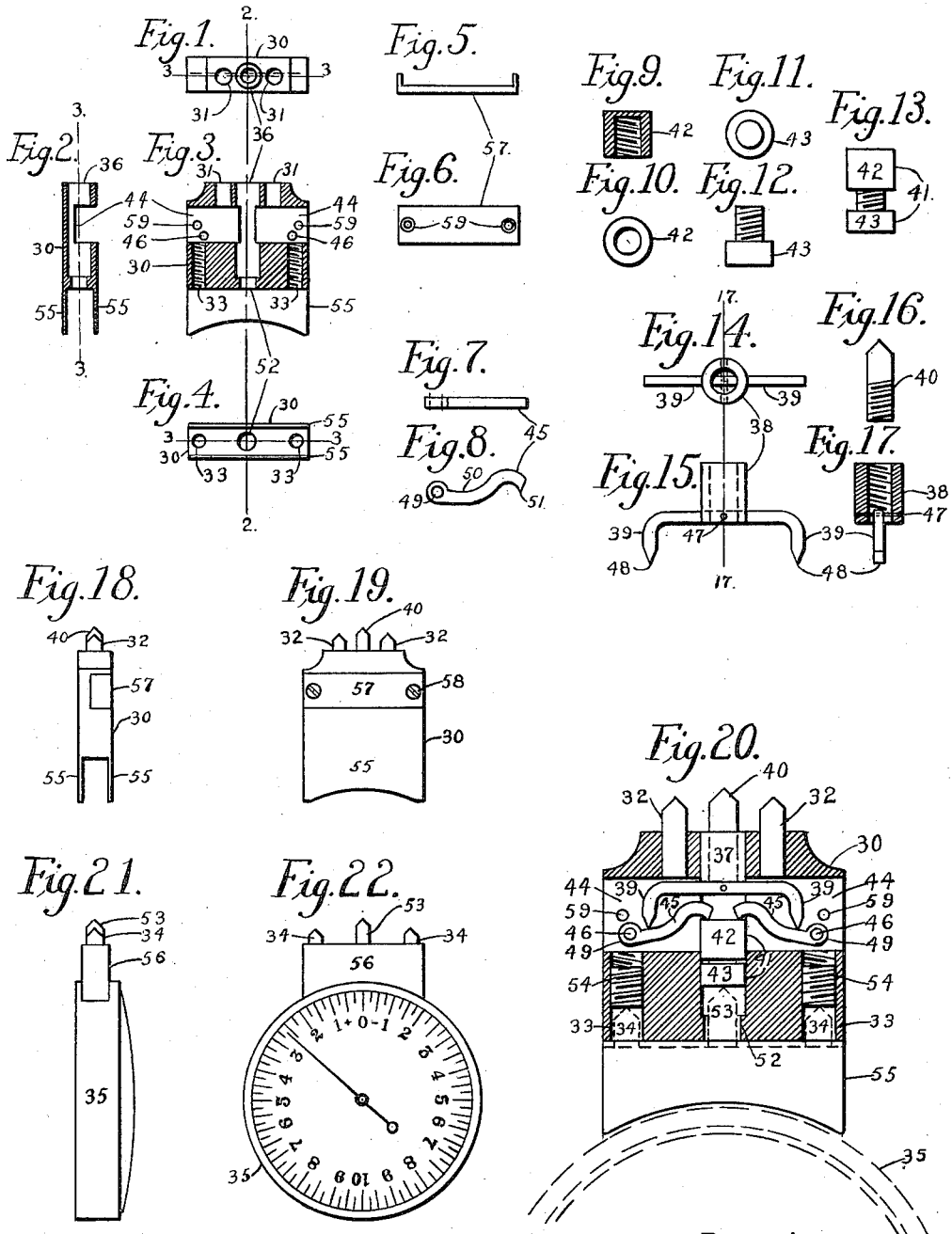

HARRY P. CASWELL, OF EVANSTON, ILLINOIS.

ATTACHMENT FOR CURVE-MEASURING INSTRUMENTS.

1,032,739. Specification of Letters Patent. Patented July 16, 1912.

Application filed August 28, 1909. Serial No. 515,057.

*To all whom it may concern:*

Be it known that I, HARRY P. CASWELL, a native citizen of the United States, residing in the city of Evanston, in the county of Cook and State of Illinois, have invented a new and useful Attachment for Curve-Measuring Instruments, of which the following is a specification.

My invention relates to instruments for measuring curved surfaces, and for determining the radius and characteristics of such surfaces.

The object of my invention is to provide an auxiliary attachment which can be applied to, and used in connection with, curve measuring instruments, such as the so called lens measures, now in general use, and, which will enable the user of such curve measure, in connection with my invention, to measure curved surfaces, of lenses and other objects which are too small to cover and be measured by the contact points of the ordinary curve measures without the aid of my invention.

To explain the principles of my invention, and the best mode in which I contemplate applying those principles, the accompanying drawings show the form, of my invention, adapted for use with the style and form of curve measures now in general use, called lens measures, in which:—

Figure 1, is a plan of the contact end of the case of my attachment: Fig. 2, is a cross section, of the case, on the line 2—2 of Figs. 1, 3, and 4: Fig. 3, is a longitudinal section, of the case, on the lines 3—3 of Figs. 1, 2, and 4: Fig. 4, is a plan of the reverse end of the case: Figs. 5, and 6, are side and front views of the cover for the case: Fig. 7, is a plan and Fig. 8, is an elevation of one of the levers: Fig. 9, is an enlarged section and Fig. 10, is an enlarged end view, of the shell nut of the follower: Fig. 11, is an enlarged end view, and Fig. 12, is an enlarged elevation, of the cylindrical screw of the follower: Fig. 13, is an enlarged elevation of the follower, consisting of the shell nut, Figs. 9 and 10, and the screw, Figs. 11 and 12, assembled together: Fig. 14, is an enlarged plan, and Fig. 15, is an enlarged elevation, of the cylinder and yoke, and Fig. 16, is an enlarged elevation of the contact pin of the plunger: Fig. 17, is an enlarged cross section, on line 17—17, of Figs. 14 and 15, of the cylinder and yoke, which when assembled together with the contact pin, Fig. 16, form the plunger: Fig. 18, is a side elevation, and Fig. 19, is a front elevation, of my complete invention: Fig. 20, is an enlarged longitudinal section, on line 3—3, of Figs. 1, 2, and 4, of the case, with the contact pieces, the plunger, the levers, and the follower assembled in position, in the case, forming my attachment and illustrating my invention: Fig. 20, shows by the dotted lines an enlarged outline, partly broken away, of the curve measure, now in general use, located, in the drawings, in its relative position to my attachments, when same are in connection ready for use: Fig. 21, is a side elevation, and Fig. 22, is a front elevation, of the curve measures, now in general use, located in the drawings, in projected positions, in relation to Figs. 18 and 19, of my attachment, to illustrate the relative position in which my attachment is brought together and connected with the curve measure for use.

Similar figures relate to similar parts throughout the several views.

The ordinary curve measure, shown by Figs. 21 and 22, and indicated, partly, by the dotted lines in Fig. 20, is old and is shown and referred to in this specification and drawings only so far as it coöperates with my attachment illustrating my invention.

The contact end of the case 30, has two holes 31, 31, in which contact pieces 32, 32, are held, at the other or reverse end of the case are cavities 33, 33, to admit the fixed contact pieces 34, 34, of the curve measure 35. A central bore, 36, is formed in the case to receive and guide the plunger 37, which consists of the cylinder 38, the yoke 39, and the contact piece 40,—Figs. 14, 15, 16, 17 and 20, and to receive and guide the follower 41, Fig. 13, which consists of the cylindrical shell nut 42, and the cylindrical screw 43. Intersecting the central bore, the case has a chamber 44, in which the yoke 39, and the levers 45, 45, are received and move to transmit motion received by the plunger 37, to the follower 41. Lever bearings 46, 46, are provided in the chamber 44, on which the levers 45, 45, are fulcrumed and turn.

The yoke 39, Figs. 14, 15, 17 and 20, is received in a slot in the end of the cylinder 38, and is held by a yoke stud 47, on which the yoke can slightly oscillate to equalize the bearing force exerted on each of the two levers 45, 45; both ends of the yoke are formed wedge shape terminating to form line edge lever bearings 48, 48, Fig. 15, against the levers to transmit motion to the levers.

The levers 45, 45, Figs. 7, 8 and 20, each have a fulcrum bearing 49, on which they turn, a bearing 50, Fig. 8, to receive motion from the yoke 39, and a line edge follower bearing 51, Fig. 8, to transmit motion from the levers to the follower 41. The axis of the center of the fulcrum bearing 49, the surface of the yoke bearing 50, and the line edge of the follower bearing 51, of the levers are in the same plane; this, with the relative positions and proportions of all the parts, secures proper ratio of movement.

The follower 41, is composed of two pieces and constructed to allow the length of the follower to be adjusted, to compensate for wear of the pieces of the curve measure and of the parts of my attachment.

The case has a hole 52, concentric with the axial line of the central bore 36, to freely admit the movable contact piece 53, of the curve measure. The hole 52, is made of smaller diameter than the central bore 36, to form a shoulder to hold the follower in the case.

Internal screw threads are formed in the cavities 33, 33, and plugs 54, 54, formed with external screw threads, are inserted in the cavities to form adjustable end pieces adapted to bear endwise on the points of the fixed contact pieces of the curve measure, without allowing contact, endwise, of the case of my attachment with the case of the curve measure and insuring the proper relative position of the points of all the contact pieces of my attachment to the points of all the contact pieces of the curve measure, with which it is used. It is essential that the relative position of all the contact pieces be thus maintained and to insure this result, the cavities 33, 33, and the hole 52, are made large to freely admit, without side contact, the contact pieces 34, 34, and the movable contact piece 53, of the curve measure.

Extensions 55, 55, are fixed to my attachment which are shaped to extend over the sides of the contact head 56, of the curve measure, and to clamp by spring pressure on the sides of the contact head, to sustain and maintain the connection and position of my attachment to the curve measure while in use.

The cover 57, fits over and incloses the chamber 44, of my attachment and is held in place preferably by screws 58, 58, which enter holes 59, 59, in the cover 57, and the case 30.

The movable contact piece 53, of the curve measure 35, is constantly pressed outward by a spring within the curve measure; when a curved surface, to be measured, is pressed against all the contact points of the curve measure the movable contact piece 53, yields to and is held against the curved surface by the pressure of the spring, and the position of the point of the movable contact piece 53, relative to the points of the fixed contact pieces 34, 34, is transmitted through suitable mechanism and the radius of the measured curve shown by the corresponding position of the pointer on the dial of the curve measure.

When my attachment is connected with the curve measure, as indicated by Fig. 20, and the contact points 32, 32, and 40, are pressed against a curved surface, to be measured, the outward pressure, of the spring, in the curve measure 35, is transmitted, from the movable contact piece 53, of the curve measure, through my mechanism, to the movable contact piece 40, of my attachment and holds the point thereof against the curved surface, being measured; and the relative position of the points of the contact pieces 32, 32, and 40, of my attachment, are transmitted through the mechanism of my attachment, and of the curve measure, and shown by the position of the pointer on the dial of the curve measure.

The motion and position of the contact point 40, of my attachment, transmitted through the plunger is distributed by the yoke 39, of the plunger, equally to each of the levers, the levers, in turn, transmit it equally to the follower 41; the follower being always in contact with the point of the contact piece 53, of the curve measure, the motion is thus transmitted from my attachment to the mechanism of the curve measure and shown by its pointer and dial. This distribution, of the force and movement, by the yoke and two levers divides and balances the stresses, reduces binding and cramping and lessens friction.

In ordinary curve measures, which are in general use, the contact points are spread apart to the limit allowed by the short diameter of an ordinary eye glass lens, to increase the base line of measurement and thus lessen effect of inaccuracies. This prevents measuring, with ordinary curve measures, pieces of broken lenses, which it is desired to replace, and also prevents measuring the small lenses attached to the ordinary lenses to make the bifocal lenses now widely in general use. With my invention, attached to and used in connection with such an ordinary curve measure, pieces of broken lenses and the small bifocal lenses can be measured without permanently interfering with the use of the curve measure for measuring the larger lenses if so desired.

I claim as my invention:

1. In combination, a measuring instrument having a set of relatively movable contact pieces, a device adapted to be attached to said instrument also having a set of relatively movable contact pieces, and mechanism mounted on said device between said sets for translating a relative movement between the contacts of one set into a relative movement between the contacts of the other set.

2. In combination, a measuring instrument having a set of relatively movable contact pieces, a device adapted to be attached to said instrument also having a set of relatively movable contact pieces, the contact pieces of one set having a different spacing from the contact pieces of the other set, and mechanism mounted on said device between said sets of contacts for translating a relative movement between the contacts of one set into a relative movement between the contacts of the other set.

3. In combination, a measuring instrument having fixed contacts and a movable contact, a device adapted to be attached to said instrument also having fixed contacts and a movable contact, means on said device for positioning it on said instrument with the several fixed contacts occupying a definite relation to each other, and mechanism mounted on said device between the said movable contacts for causing a movement of one to be translated into a movement of the other.

4. In combination, a measuring instrument having fixed contacts and a movable contact, a device adapted to be attached to said instrument also having fixed contacts and a movable contact, means on said device for positioning it on said instrument with the several fixed contacts occupying a definite relation to each other, and mechanism mounted on said device between the said movable contacts for causing a movement of one to be translated into a movement of the other, said mechanism including a member adjustable in the direction of movement of one of the movable contacts.

5. In combination, a measuring instrument having fixed contacts and a movable contact, a device adapted to be attached to said instrument also having fixed contacts and a movable contact, adjustable bearing members on said device for engaging with the fixed contacts of said instrument, and mechanism mounted on said device between the said movable contacts for causing a movement of one to be translated into a movement of the other.

6. In combination, a measuring instrument having fixed contacts and a movable contact, an attachment for said instrument comprising a casing also having fixed contacts and a movable contact, adjustable bearing members on said casing for engaging with the fixed contacts of said instrument, and mechanism supported by the casing between the said movable contacts for causing a movement of one to be translated into a movement of the other, said mechanism including a follower engaging with the movable contact of said instrument and adjustable in the direction of movement of one of the latter contacts.

7. An attachment for a measuring instrument having relatively movable contact pieces comprising a casing, relatively movable contact pieces mounted in the casing, a movable follower mounted in the casing, mechanism between one of the latter contacts and said follower for translating a movement of that contact into a movement of the follower, and bearing members in the casing, said bearing members and said follower being so located as to engage with the contact pieces on said instrument when the attachment is placed on the instrument.

8. In combination, a measuring instrument having fixed contacts and a movable contact, a device adapted to be attached to said instrument also having fixed contacts and a movable contact, means on said device for positioning it on said instrument with the several fixed contacts occupying a definite relation to each other, and mechanism mounted on said device between the said movable contacts for causing a movement of one to be translated into a movement of the other, said mechanism including an element for adjusting the normal position of said movable contacts relative to each other.

9. An attachment for a measuring instrument having relatively movable contact pieces comprising a casing, relatively movable contact pieces mounted in the casing, a movable follower mounted in the casing, mechanism mounted in the casing between one of the latter contact pieces and said follower for translating a movement of that contact piece into a movement of the follower, bearing members in the casing, and said casing having openings registering with said bearing members and with said follower for the reception of the contact pieces of said instrument.

10. An attachment for a measuring instrument having relatively movable contact pieces comprising a casing, relatively movable contact pieces mounted in the casing, a movable follower mounted in the casing, mechanism between one of the latter contacts and said follower for translating a movement of that contact into a movement of the follower, bearing members in the casing, and said casing having openings registering with said bearing members and said follower for the reception of the contact pieces of said instrument, said bearing members each being adjustable so as to permit the contact pieces of said instrument to be positioned in proper relation to the bearing members and to the follower.

11. An attachment for a measuring instrument having relatively movable contact pieces comprising a casing, stationary contact pieces mounted on the casing, a movable contact piece mounted on the casing, a movable follower within the casing beneath said movable contact piece, mechanism between the latter contact piece and said follower for transmitting motion from the contact piece to the follower, said casing having an opening therein beneath the follower to receive one of the contact pieces of said instrument, and bearing seats on said casing for engaging with the remaining contact pieces on said instrument.

12. An attachment for a measuring instrument having relatively movable contact pieces comprising a casing, stationary contact pieces mounted on the casing, a movable contact piece mounted on the casing, a movable follower within the casing beneath said movable contact piece, mechanism between the latter contact piece and said follower for transmitting motion from the contact piece to the follower, said casing having an opening therein beneath the follower to receive one of the contact pieces of said instrument, and bearing seats on said casing for engaging with the remaining contact pieces on said instrument, said follower being made in two parts adjustable relative to each other in the direction of movement of the aforesaid movable contact piece.

13. An attachment for a measuring instrument having relatively movable contact pieces comprising a casing, stationary contact pieces mounted on the casing, a movable contact piece mounted on the casing, a movable follower within the casing beneath said movable contact piece, mechanism between the latter contact piece and said follower for transmitting motion from the contact piece to the follower, said casing having an opening therein beneath the follower to receive one of the contact pieces of said instrument and permit it to engage with said follower, and adjustable bearing members on said casing for engaging with the remaining contact pieces on said instrument.

14. An attachment for a measuring instrument having relatively movable contact pieces comprising a casing, stationary contact pieces mounted on the casing, a movable contact piece mounted on the casing, a movable follower within the casing beneath said movable contact piece, mechanism between the latter contact piece and said follower for transmitting motion from the contact piece to the follower, said casing having an opening therein beneath the follower to receive one of the contact pieces of said instrument and permit it to engage with said follower, and adjustable bearing members in said casing for engaging with the remaining contact pieces on said instrument, said follower being made in two parts adjustable relative to each other in the direction of movement of the aforesaid movable contact piece.

HARRY P. CASWELL.

Witnesses:
JOHN C. MATHEWS,
ARTHUR L. SCHWARTZ.

Copies of this patent may be obtained for five cents each, by addressing the "Commissioner of Patents, Washington, D. C."